United States Patent
O'Grady et al.

(10) Patent No.: US 7,031,783 B2
(45) Date of Patent: Apr. 18, 2006

(54) VIRTUALIZED GENERIC EQUIPMENT MODEL DATA AND CONTROL ROUTER FOR FACTORY AUTOMATION

(75) Inventors: William T. O'Grady, Austin, TX (US); Joel Taylor, San Jose, CA (US); Ryo Takeda, Hachioji (JP); Nobuhiko Yoshimura, Kawasaki (JP); John D. McNeill, Austin, TX (US); Donald F. Shafer, Austin, TX (US); Janet Gilmore, Spicewood, TX (US); Patrick Doane, Austin, TX (US)

(73) Assignee: Agilent Technologies, Inc., Palo Alto, CA (US)

( * ) Notice: Subject to any disclaimer, the term of this patent is extended or adjusted under 35 U.S.C. 154(b) by 656 days.

(21) Appl. No.: 10/014,772

(22) Filed: Dec. 11, 2001

(65) Prior Publication Data

US 2003/0004586 A1 Jan. 2, 2003

Related U.S. Application Data

(60) Provisional application No. 60/301,952, filed on Jun. 29, 2001.

(51) Int. Cl.
*G06F 19/00* (2006.01)

(52) U.S. Cl. .................... 700/96; 700/108; 700/121; 709/223; 709/238

(58) Field of Classification Search ............ 700/121, 700/108, 96; 709/223, 238
See application file for complete search history.

(56) References Cited

U.S. PATENT DOCUMENTS

| 5,657,252 | A | * | 8/1997 | George .................... 702/83 |
| 5,951,649 | A | * | 9/1999 | Dobbins et al. ............ 709/238 |
| 6,330,614 | B1 | * | 12/2001 | Aggarwal et al. ........... 709/236 |
| 6,452,925 | B1 | * | 9/2002 | Sistanizadeh et al. ....... 370/352 |
| 6,526,134 | B1 | * | 2/2003 | Wallenius ............... 379/201.01 |
| 6,587,744 | B1 | * | 7/2003 | Stoddard et al. ............ 700/121 |
| 6,760,775 | B1 | * | 7/2004 | Anerousis et al. .......... 709/238 |
| 2002/0120769 | A1 | * | 8/2002 | Ammitzboell ............. 709/238 |
| 2002/0174211 | A1 | * | 11/2002 | Ishizaki et al. ............. 709/223 |

OTHER PUBLICATIONS

Deng et al., "Development of an Object-Based Equipment Controller for Semiconductor Equipment Communications"; IEEE, 1999; pp. 1240-1245.*

DeBolt et al., "Implementation of the SEMI, Generic Equipment Model, Using Object-Based Cell Technology"; IEEE, 1991; pp. 102-105.*

(Continued)

*Primary Examiner*—Leo Picard
*Assistant Examiner*—Carlos Ortiz-Rodriguez (57) ABSTRACT

An interface between an automation host and a plurality of tools is used to perform a processing step. The interface includes a single communications and process behavioral connection interface to the automation host. The interface also includes a plurality of virtual host interfaces. Each virtual host interface from the plurality of virtual host interfaces provides a communications and process behavioral interface to one of the tools in the plurality of tools. The automation host can control and coordinate operation of all tools in the plurality of tools via the single communications and process behavioral connection interface.

22 Claims, 4 Drawing Sheets

OTHER PUBLICATIONS

Ghiselli, "Practical Aspects of the GEM Model for Factory Automation"; IEEE, 1990; pp. 50-54.*

Nguyen, "The Development and Implementation of a Cell Controller Framework"; IEEE, 1993; pp. 54-57.*

Zaniolo, "The Database Language GEM"; ACM, 1983; pp. 207-218.*

Cisco IOS IP Configuration Guide, "Configuring PGM Host and Router Assist".*

Sematech, "Virtual Factory Equipment Interface (VFEI): Version 2.2"; 1995, pp. 1-93.*

* cited by examiner

VIRTUALIZED GENERIC EQUIPMENT MODEL DATA AND CONTROL ROUTER FOR FACTORY AUTOMATION

RELATED APPLICATIONS

The present application claims the benefit of prior filed co-pending provisional application having a provisional application No. of 60/301,952, filed on Jun. 29, 2001.

BACKGROUND

The present invention concerns the manufacturing of semiconductor circuits and pertains particularly to a virtualized generic equipment model data and control router for factory automation.

The semiconductor manufacturing process is made up of a significant number of unique semiconductor materials processing steps. At each step the material is exposed to various mechanical, chemical or electrical processes that either change or measure the nature of the semiconductor material. Each one of these steps requires a unique and highly specialized materials processing tool.

In any given fabrication manufacturing process step, there are typically five common actions performed. In the first action, the material (e.g., a silicon wafer) arrives at a tool. At the tool, the material is detected, identified and onloaded.

In a second action, the material is moved into a process chamber. In a third action, the material is processed. In a fourth action, the material is moved out of the process chamber. In a fifth action, the material is offloaded from the tool.

In the first, second, fourth and fifth action, the material is transported and these actions are collectively referred to as the materials transport function. In the third action, the material is processed and this action is referred to as the materials processing function. Typically the materials transport function and the materials processing function are integrated into a single process tool.

Either a cell controller or a factory host system manage the automation of a collection of tools. Herein, the factory host and the cell controller are both referred to as the "process step host" or "automation host". For each tool, the process step host typically has one communication path and manages one process state model. This one to one relationship of communication, state model and process step provides an easy method of managing the automation.

There are cases, however, where it takes multiple physical tools to accomplish the five actions for a single manufacturing process step. The most prevalent case of this is the material test process step, where the five steps of the materials processing function and the materials transport functions described above are typically three separate tools.

For example, materials onload and offload are accomplished by an automated materials transport and docking system typically known as an Equipment Front End Module (EFEM). Materials movement within the process step is accomplished by a materials handling system typically known as a prober or handler. Materials processing for the test process step is accomplished by a test system.

Herein, a process step that requires these multiple physical tools to complete the step is referred to as a non-integrated materials transport process step. For a non-integrated materials movement process step, the process step host is not only managing the process step, but also has to micromanage the relationship between the multiple tools required to accomplish that single process step. Unlike an integrated materials movement tool, the process step host must keep track of multiple individual process state models and multiple communication paths for a single process step.

In order to provide a common framework for the automation of the semiconductor manufacturing processes, semiconductor manufacturers rely upon mechanical and software standards developed by several industry wide consortiums. These automated manufacturing processes include both the individual process step tools, and the manufacturing process cells made up of several individual process tools under the direction of the process step host computer. The vast majority of these automation standards are issued by the Semiconductor Equipment Manufacturers Institute (SEMI). The fundamental communication standards that govern the process step host to tool communication and behavior are the SEMI E4, E5 E30 and E39 standards. These standards are commonly known as the SEMI SECS/GEM standards. SEMI also provides an additional standard, E87, which provides for the management of materials carriers used to transport material between process steps and process tools.

One particular aspect of SEMI E30 and E87 is that they require the process tool to provide and maintain an equipment process state model. This model allows the automation function to track and understand the physical and logical behavior of the process tool. By following the process tool's behavioral process state model, the automation function can understand what the process tool is doing, and what it is valid and able to do next. SEMI E30 and E87 also require the process to provide and maintain control, port, and communication state models.

In the specific case of 300 mm semiconductor fabrication facilities (fabs), the application of the relevant SEMI and other standards is further described by the CIM Global Joint Guidance for 300 mm Semiconductor Factories (GJG) issued by International Sematech (ISMT) and the Japan 300 mm Semiconductor Technology Conference (J300).

The GJG provides an important, specific requirement for manufacturing process automation that is a critical concern for nonintegrated materials handling process step implementations. GJG CIM Guidelines Revision 5, Section 1, Paragraph 1.1 states:

A single physical communication connection must link the production equipment to the host. A single physical communication connection means that the Equipment Front End Module (EFEM) is integrated through the production equipment rather that connected directly to the host.

With respect to the materials test process step, the above-quoted requirement means that the carrier management capabilities of the EFEM, the materials movement capabilities of the prober, and the materials processing capabilities of the test system, must all be controlled and communicated to the process step host via a single, integrated communications link.

The non-integrated materials process step requires a much higher level of control, and causes problems when trying to meet the requirements of the SEMI and GJG standards that govern the process step. The common implementations of the SEMI standards assume that a single tool accomplishes the process step, and that the materials movement function and materials processing function are all accomplished by that single tool. The GJG requires both functions be connected to the process step host via a single communications link.

SUMMARY OF THE INVENTION

In accordance with the preferred embodiment of the present invention, an interface between an automation host and a plurality of tools is used to perform a processing step. The interface includes a single communications and process behavioral connection interface to the automation host. The interface also includes a plurality of virtual host interfaces. Each virtual host interface from the plurality of virtual host interfaces provides a communications and process behavioral interface to one of the tools in the plurality of tools. The automation host can control and coordinate operation of all tools in the plurality of tools via the single communications and process behavioral connection interface.

DESCRIPTION OF THE PRIOR ART

Figure 1:
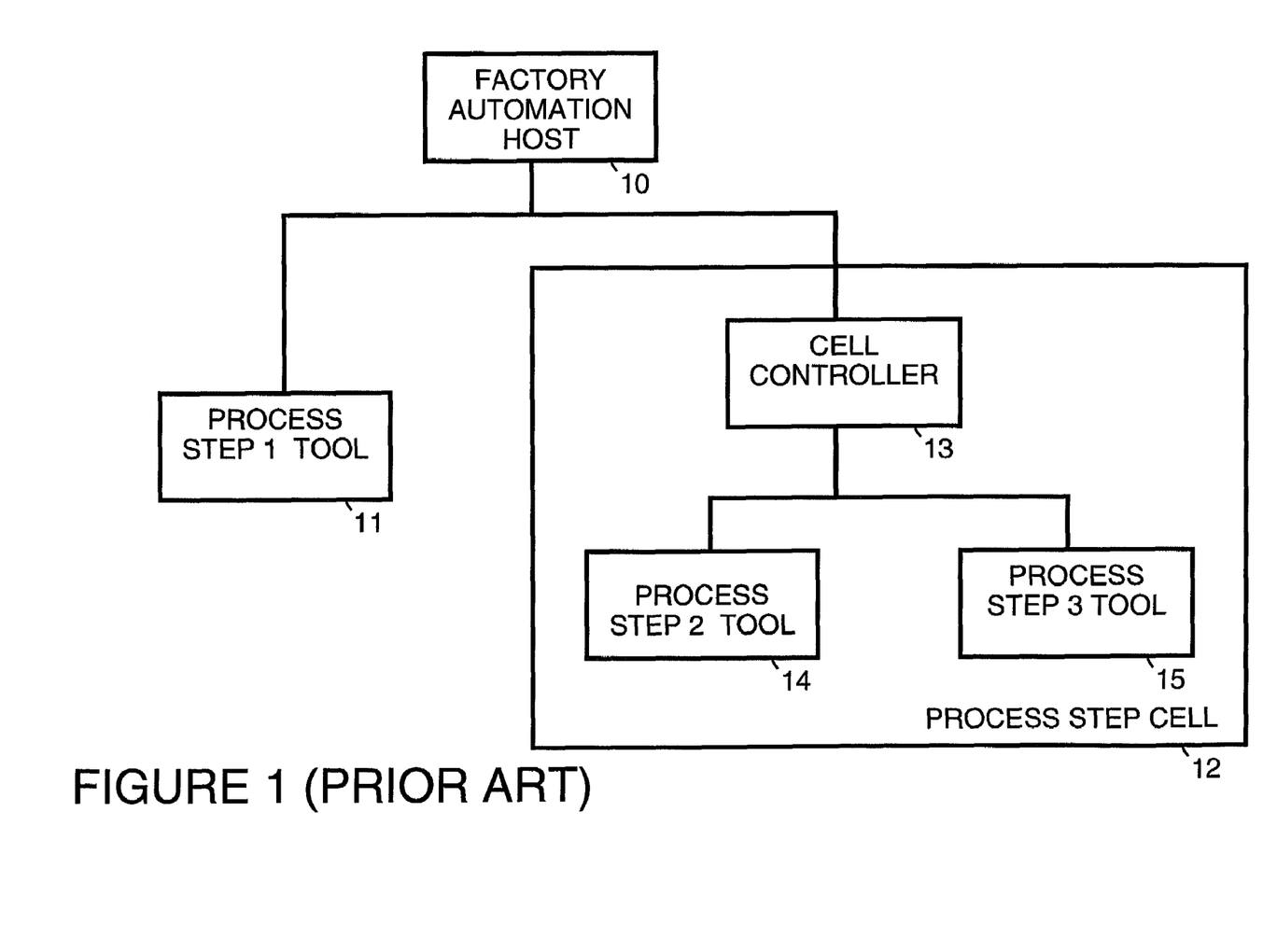
FIG. 1 shows a factory automation host interacting with a process step tool and a cell controller within a process step cell.

FIG. 1 shows a factory automation host 10 interacting with a process step 1 tool 11 and a cell controller 13 within a process step cell 12. Factory automation host 10 manages the automation of process step 1 tool 11. Cell controller 13 within process step cell 12 manages the automation of a process step 2 tool 14 and a process step 3 tool 15.

Figure 2:
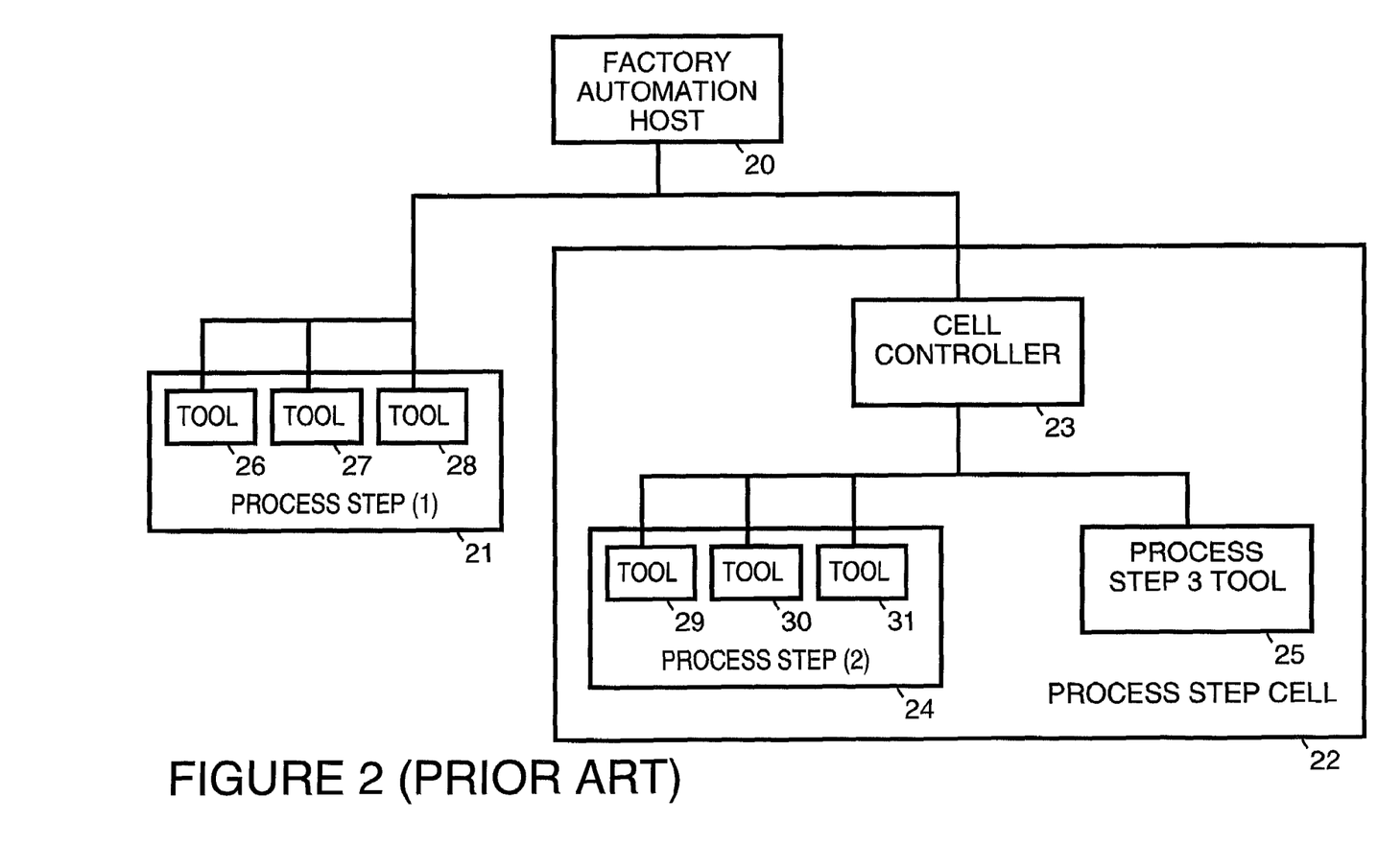
FIG. 2 shows the inclusion of a non-integrated materials transport process step into an automated manufacturing process.

FIG. 2 shows the inclusion of a non-integrated materials transport process step into an automated manufacturing process. A factory automation host 20 interacts with a tool 26, a tool 27 and a tool 28 within a process step (1) 21 and a cell controller 23 within a process step cell 22. Factory automation host 20 manages the automation of tools 26, 27 and 28 within process step (1) 21. Cell controller 23 within process step cell 22 manages the automation of a tool 29, a tool 30 and a tool 31 within process step (2) 24 and process step 3 tool 25.

For example, tool 26 and tool 29 are used to accomplish the materials processing function. The materials transport functions are accomplished by tool 27 and tool 30, representing the prober, and tool 28 and tool 31, representing the EFEM.

DESCRIPTION OF THE PREFERRED EMBODIMENT

Figure 4:
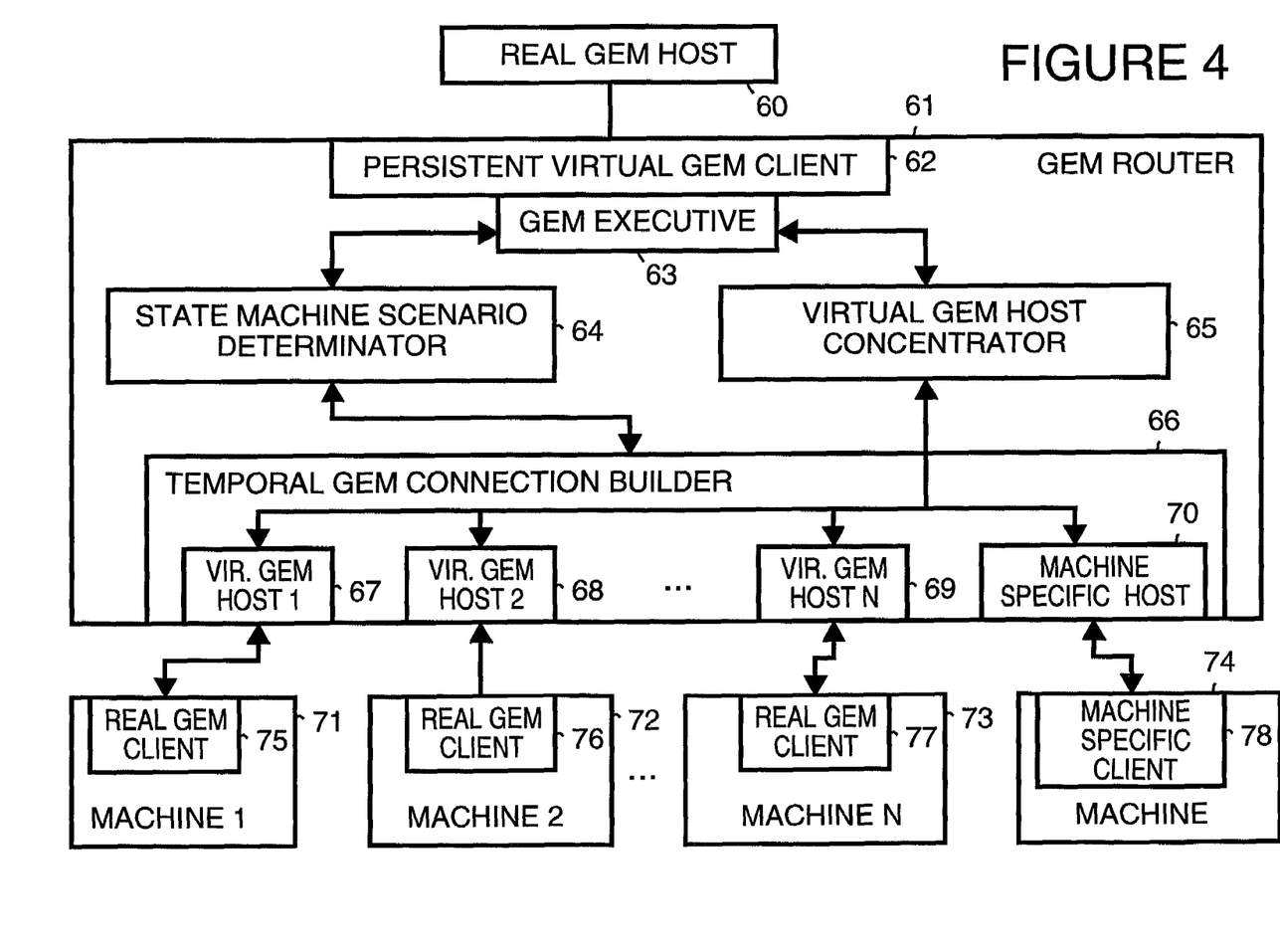
FIG. 4 shows a simplified block diagram of a GEM router in accordance with a preferred embodiment of the present invention.

As shown in FIG. 4, a virtualized generic equipment model data and control router for factory automation (GEM router) can be used to provide a mechanism for aggregating the communications and process state model functions of multiple process tools into a single process step communications path to a process step host. A GEM router implements a virtual GEM interface.

Using a GEM router allows a non-integrated materials transport process step to appear to the process step host as a single, integrated materials transport process step.

Figure 3:
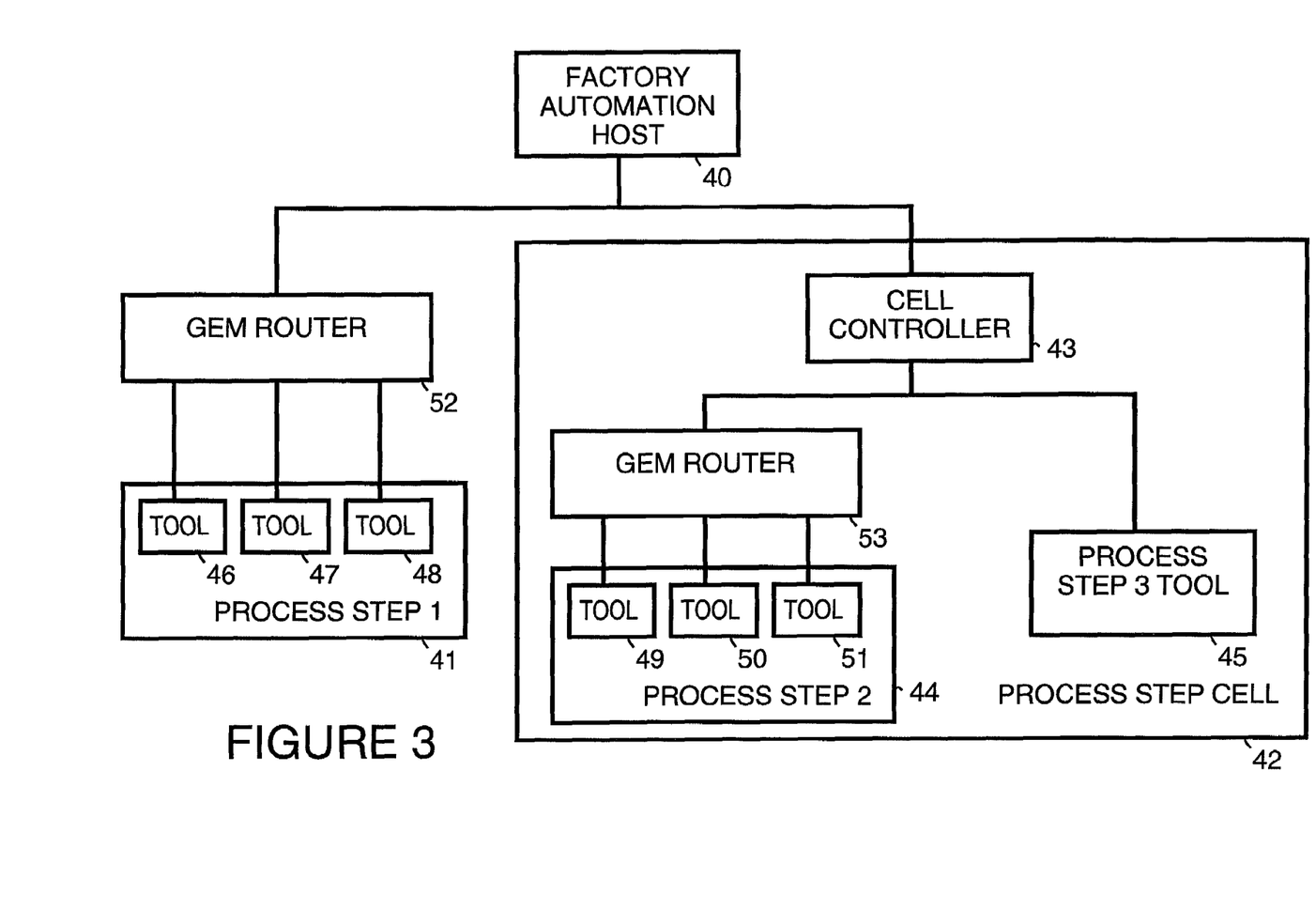
FIG. 3 shows a generic equipment model (GEM) router interacting with factory automation host 40 and a plurality of tools in accordance with a preferred embodiment of the present invention.

For example, FIG. 3 shows a factory automation host 40 interacting with a GEM router 52 and a cell controller 43 within a process step cell 42. GEM router 52 interacts with a tool 46, a tool 47 and a tool 48 within a process step (1) 41. Cell controller 43 interacts with a GEM router 53 and a process step 3 tool 45. GEM router 53 interacts with a tool 49, a tool 50 and a tool 51 within process step (2) 44.

For example, tool 46 and tool 49 are used to accomplish the materials processing function. The materials transport functions are accomplished by tool 47 and tool 50, representing the prober, and tool 48 and tool 51, representing the EFEM.

In a preferred embodiment of the present invention, a generic equipment model (GEM) interface is used to interact with tools within a process step. However, other embodiments of the invention are not limited to the use of a GEM connection. As will be understood by persons of ordinary skill in the art, data control and routing of non-GEM based communications automation scenarios can be accomplished using the principles of the present invention described herein.

Also, software that implements a GEM router can be located in a number of different places. For example, the GEM router function can reside on a local controller of one process step tool, on a cell controller, or on a factory host.

FIG. 4 shows a block diagram of a GEM router 61. GEM router 61 connects across a factory automation boundary to a real GEM host 60. To implement the connection, a persistent virtual GEM client 62 within GEM router 61 always exists.

Connected to persistent virtual GEM client 62 is a GEM Executive 63. GEM Executive 63 handles requested state changes and provides scenario information for virtual GEM host generation.

A state machine scenario determinator 64 takes information originating from real GEM host 60 and identifies the number and type of virtual GEM hosts that must be created by a GEM temporal connection builder 66. Virtual GEM host connections are built based on the process requirements relayed from the factory automation system.

A virtual GEM host concentrator 65 relays actions, events and reports coming from virtual GEM hosts (represented in FIG. 4 by a virtual GEM host (1) 67, a virtual GEM host (2) 68 and a virtual GEM host (n) 69) before being passed to persistent virtual GEM client 62 and on up to the real GEM host 60.

Virtual GEM host (1) 67 interacts with a real GEM client 75 within a machine (1) 71. Virtual GEM host (2) 68 interacts with a real GEM client 76 within a machine (2) 73. Virtual GEM host (n) 69 interacts with a real GEM client 77 within a machine (n) 73. A machine specific host 70 interacts with a machine specific client 78 within a machine 74. For example, each machine is a process step tool.

GEM router 61 establishes communications to each individual process step tool. For each tool, temporal GEM connection builder 66 establishes a virtual GEM host connection. The existence of a host above GEM router 61 is transparent to each process step tool.

The specific GEM capabilities of each tool are determined at connection time, and a persistent description of those capabilities is stored within GEM router 61. These capabilities include process alarm and control state models, process and tool variables, and a valid SECS message set.

GEM router 61 establishes communication with real GEM host 60 as a single point of communication for real GEM host 60. Since real GEM host 60 is a process step host, GEM router 61 establishes communications as a single point of communication for the process step. The existence of multiple individual tools is transparent to real GEM host 60.

Each message from real GEM host 60 is received by persistent virtual GEM client 62 and is analyzed. Based on this analysis, the message is deconstructed into several individual messages and then passed via temporal virtual GEM host connection to each individual process step tool's real GEM client.

If a host message is a request for information, virtual GEM host concentrator 65 may collect additional information from other process step tools via their temporal virtual GEM host connections. Once virtual GEM host concentrator 65 has enough information to resolve the host request, virtual GEM host concentrator 65 will construct a valid GEM message to respond to real GEM host 61.

Each message from an individual process step tool's real GEM client function is received by the appropriate temporal virtual GEM host connection and analyzed. Based on this analysis, the GEM host concentrator 65 may collect additional information from other process step tools via their temporal virtual GEM host connections. Once the GEM host concentrator 65 is satisfied, it constructs a single message and passes it to the process step GEM host.

In this way GEM host concentrator 65 aggregates the communication message sets of a collection of individual process tools into a single communications message set for the collection of tools.

Any message from real GEM host 60 or any process step tool can cause a change in the process step's process state model. The process step's process state model is an aggregation of each individual process step tool's process state model. State machine scenario determinator 64 tracks the changes to each individual process step tool's process state model, and maintains an aggregated process state model for the entire process step. The same actions are performed for changes to the control state models and port state models.

State machine scenario determinator 64 aggregates the process state models of a collection of individual process tools into a single process state model for the collection of tools. Likewise state machine scenario determinator 64 aggregates the control state models of a collection of individual process tools into a single control state model for the collection of tools. Likewise state machine scenario determinator 64 aggregates the port state models of a collection of individual process tools into a single port state model for the collection of tools.

GEM router 61 allows the process variables set, and variable identification numbers of a collection of individual process tools to be aggregated into a single process variable set and variable identification number range for the collection of tools.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A control router for providing communication between an automation host and a plurality of manufacturing tools, each of the plurality of manufacturing tools being used to perform a processing step, the control router comprising:
   a single communications and process behavioral connection interface to the automation host; and,
   a plurality of virtual host interfaces all implemented within the control router, each virtual host interface from the plurality of virtual host interfaces providing a communications and process behavioral interface to one of the manufacturing tools in the plurality of manufacturing tools;
   wherein the automation host can control and coordinate operation of all manufacturing tools in the plurality of manufacturing tools via the single communications and process behavioral connection interface.

2. A control router as in claim 1 wherein a number of virtual host interfaces is variable depending upon a number of manufacturing tools in the plurality of manufacturing tools.

3. A control router as in claim 1 wherein the plurality of virtual host interfaces implement different communications and process behavioral interface for different manufacturing tools from the plurality of manufacturing tools.

4. A control router as in claim 1 wherein the single communications and process behavioral connection interface makes the plurality of manufacturing tools appear to the automation host as a single tool.

5. A control router as in claim 1 additionally comprising a state machine scenario determinator that aggregates process state models for the plurality of manufacturing tools into a single process state model.

6. A control router as in claim 1 additionally comprising a state machine scenario determinator that aggregates control state models for the plurality of manufacturing tools into a control process state model.

7. A control router as in claim 1 additionally comprising a state machine scenario determinator that aggregates port state models for the plurality of manufacturing tools into a single port state model.

8. A control router as in claim 1 wherein a process variables set and variable identification numbers of manufacturing tools from the plurality of manufacturing tools are aggregated into a single process variable set and variable identification number range for the plurality of manufacturing tools.

9. A control router as in claim 1 additionally comprising a host concentrator that aggregates communication message sets of individual manufacturing tools from the plurality of manufacturing tools into a single communications message set for the plurality of manufacturing tools.

10. A control router in 1 wherein each virtual host interface from the plurality of virtual host interfaces is compliant with the Semiconductor Equipment Manufacturers Institute (SEMI) generic equipment model (GEM) interface requirements.

11. A control router in 1 wherein the single communications and process behavioral connection interface to the automation host is compliant with the Semiconductor Equipment Manufacturers Institute (SEMI) generic equipment model (GEM) interface requirements.

12. A method for connecting an automation host to a plurality of manufacturing tools, each of the manufacturing tools being used to perform a processing step, the method comprising the following steps:
   (a) providing a separate communications and process behavioral interface to each manufacturing tool in the plurality of manufacturing tools, all the separate communications and process behavioral interfaces being provided from within a single control router; arid, (b) providing a single communications and process behavioral connection interface to the automation host, including the following substep:

(b.1) allowing the automation host to control and coordinate operation of all manufacturing tools in the plurality of manufacturing tools via the single communications and process behavioral connection interface.

13. A method as in claim 12, wherein in step (a) a number of virtual host interfaces is variable depending upon a number of manufacturing tools in the plurality of manufacturing tools.

14. A method as in claim 12, wherein in step (a) the plurality of virtual host interfaces implement different communications and process behavioral interface for different manufacturing tools from the plurality of manufacturing tools.

15. A method as in claim 12, wherein in step (b) the single communications and process behavioral connection interface makes the plurality of manufacturing tools appear to the automation host as a single manufacturing tool.

16. A method as in claim 12, additionally comprising the following step:

(c) aggregating process state models for the plurality of manufacturing tools into a single process State model.

17. A method as in claim 12, additionally comprising the following step:

(c) aggregating control state models for the plurality of manufacturing tools into a single control state model.

18. A method as in claim 12, additionally comprising the following step:

(c) aggregating port state models for the plurality of manufacturing tools into a single port state model.

19. A method as in claim 12, additionally comprising the following step:

(c) aggregating a process variables set and variable identification numbers of manufacturing tools from the plurality of manufacturing tools into a single process variable set and variable identification number range for the plurality of manufacturing tools.

20. A method as in claim 12, additionally comprising the following step:

(c) aggregating communication message sets of individual manufacturing tools from the plurality of manufacturing tools into a single communications message set for the plurality of manufacturing tools.

21. A method in 12 wherein in step (a) each separate communications and process behavioral interface is compliant with the Semiconductor Equipment Manufacturers Institute (SEMI) generic equipment model (GEM) interface requirements.

22. A method in 12 wherein in step (b) the single communications and process behavioral connection interface to the automation host is compliant with the Semiconductor Equipment Manufacturers Institute (SEMI) generic equipment model (GEM) interface requirements.

* * * * *

UNITED STATES PATENT AND TRADEMARK OFFICE
CERTIFICATE OF CORRECTION

PATENT NO. : 7,031,783 B2 Page 1 of 1
APPLICATION NO. : 10/014772
DATED : April 18, 2006
INVENTOR(S) : O'Grady et al.

It is certified that error appears in the above-identified patent and that said Letters Patent is hereby corrected as shown below:

Column 7, line 2, in Claim 12, delete "arid," and insert -- and, --, therefor.

Column 7, line 27, in Claim 16, delete "State" and insert -- state --, therefor.

Column 8, line 19, in Claim 21, delete "12" and insert -- claim 12, --, therefor.

Column 8, line 25, in Claim 22, delete "12" and insert -- claim 12, --, therefor.

Signed and Sealed this

Twelfth Day of December, 2006

JON W. DUDAS
*Director of the United States Patent and Trademark Office*